(12) United States Patent
Yang et al.

(10) Patent No.: US 11,825,462 B2
(45) Date of Patent: Nov. 21, 2023

(54) METHODS AND APPARATUS FOR SEQUENCE DESIGN BASED ON SUBSAMPLING

(71) Applicant: QUALCOMM Incorporated, San Diego, CA (US)

(72) Inventors: Wei Yang, San Diego, CA (US); Peter Gaal, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/124,433

(22) Filed: Dec. 16, 2020

(65) Prior Publication Data

US 2021/0195594 A1    Jun. 24, 2021

Related U.S. Application Data

(60) Provisional application No. 62/952,205, filed on Dec. 20, 2019.

(51) Int. Cl.
*H04W 72/04* (2023.01)
*H04W 72/044* (2023.01)
(Continued)

(52) U.S. Cl.
CPC ...... *H04W 72/0466* (2013.01); *G06F 17/145* (2013.01); *H04L 27/2032* (2013.01); *H04W 72/21* (2023.01)

(58) Field of Classification Search
CPC .......... H04W 72/0466; H04W 72/0413; G06F 17/145; G06F 17/16; H04L 27/2032; H04L 27/2614; H04L 27/2613; H04L 5/0048; H04L 27/2602; H04L 5/0016; H04L 5/001; H04L 5/0051; H04J 13/004; H04J 13/12

See application file for complete search history.

(56) References Cited

U.S. PATENT DOCUMENTS

2008/0260063 A1    10/2008  Chen et al.
2009/0135803 A1*    5/2009  Luo ................. H04L 5/0023
                                              380/268

(Continued)

FOREIGN PATENT DOCUMENTS

WO    2018224493 A1    12/2018

OTHER PUBLICATIONS

International Search Report and Written Opinion—PCT/US2020/065730—ISA/EPO—dated Apr. 9, 2021.

*Primary Examiner* — Steven Hieu D Nguyen
(74) *Attorney, Agent, or Firm* — Procopio, Cory, Hargreaves & Savitch

(57) ABSTRACT

The present disclosure relates to methods and devices for wireless communication. Aspects of the present disclosure can determine a matrix or Hadamard matrix associated with signal transmission, the matrix or Hadamard matrix including M rows and M columns. Also, aspects of the present disclosure can determine a sampling function for generating a set of sequences from the matrix or Hadamard matrix. Aspects of the present disclosure can also generate the set of sequences by sampling one of a set of rows or a set of columns based on the determined sampling function. Aspects of the present disclosure can also transmit a signal derived based on at least one sequence of the set of sequences.

69 Claims, 8 Drawing Sheets

(51) Int. Cl.
*H04L 27/20* (2006.01)
*G06F 17/14* (2006.01)
*H04W 72/21* (2023.01)

(56) References Cited

U.S. PATENT DOCUMENTS

| | | | |
|---|---|---|---|
| 2009/0303961 A1* | 12/2009 | Popovic | H04L 27/2613 |
| | | | 370/330 |
| 2015/0065153 A1* | 3/2015 | Nissila | H04L 5/0051 |
| | | | 455/450 |
| 2019/0149298 A1 | 5/2019 | Yang | |
| 2019/0238367 A1 | 8/2019 | Lei et al. | |
| 2019/0356446 A1* | 11/2019 | Kim | H04L 5/0053 |
| 2020/0162299 A1* | 5/2020 | Kim | H04J 11/0073 |
| 2021/0067392 A1* | 3/2021 | Abdoli | H04L 27/2621 |

* cited by examiner

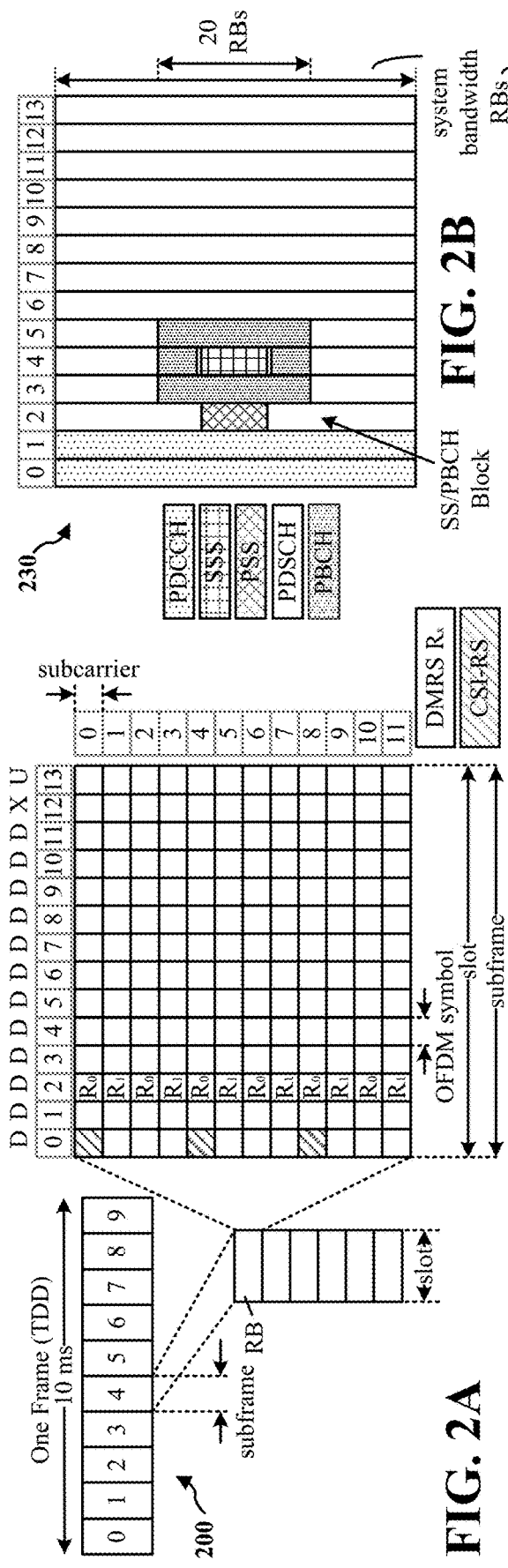
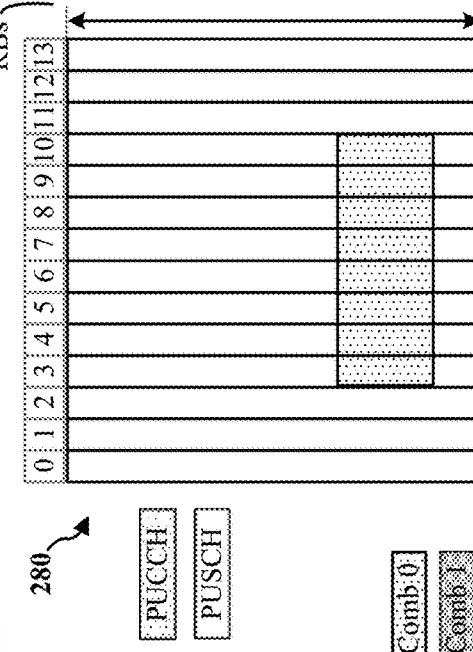
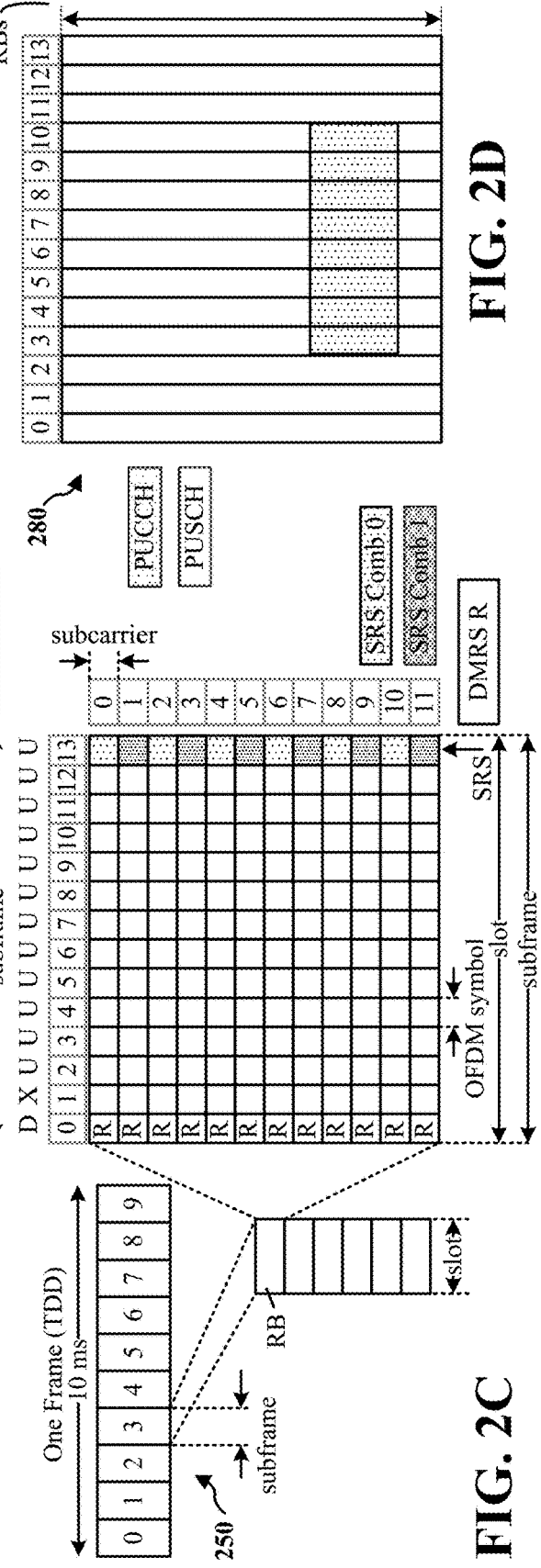
FIG. 2A
FIG. 2B
FIG. 2C
FIG. 2D

METHODS AND APPARATUS FOR SEQUENCE DESIGN BASED ON SUBSAMPLING

CROSS REFERENCE TO RELATED APPLICATION(S)

This application claims the benefit of U.S. Provisional Application Ser. No. 62/952,205, entitled "METHODS AND APPARATUS FOR SEQUENCE DESIGN BASED ON SUB SAMPLING" and filed on Dec. 20, 2019, which is expressly incorporated by reference herein in its entirety.

BACKGROUND

Technical Field

The present disclosure relates generally to communication systems, and more particularly, to methods and apparatus related to sequence design in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station or a user equipment (UE). In some aspects, the apparatus may determine a matrix or Hadamard matrix associated with signal transmission, the matrix or Hadamard matrix including M rows and M columns. In some aspects, the apparatus can generate the matrix or Hadamard matrix. The apparatus may also determine a sampling function for generating a set of sequences from the matrix or Hadamard matrix. Additionally, the apparatus may generate a set of sequences by sampling one of a set of rows or a set of columns from the matrix based on the determined sampling function.

In some aspects, the apparatus may map an uplink control information (UCI) payload to at least one sequence of the set of sequences. The apparatus may also modify the at least one sequence to generate at least one modified sequence. Also, the apparatus may point-wise multiplex at least one other sequence with each of the at least one sequence to generate at least one modified sequence. The apparatus may also convert the at least one sequence into at least one binary domain sequence. Moreover, the apparatus may modulate the at least one binary domain sequence based on $\pi/2$ binary phase shift keying (BPSK) modulation. The apparatus may also transmit a signal derived based on the determined at least one sequence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
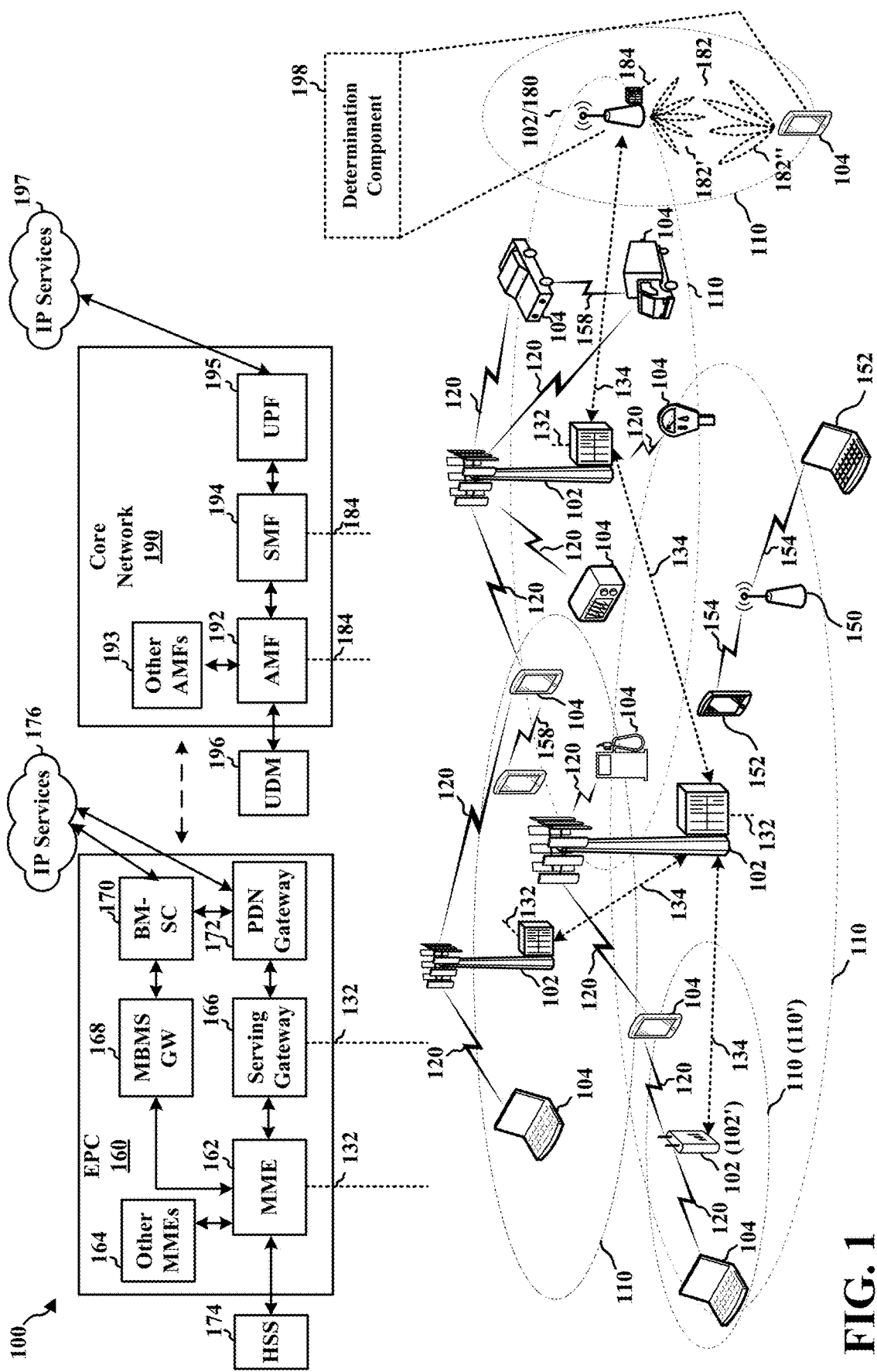
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 or the base station 102 may include a determination component 198 configured to determine a matrix or Hadamard matrix associated with signal transmission, the Hadamard matrix including M rows and M columns. Determination component 198 may also be configured to generate the matrix or Hadamard matrix. Determination component 198 may also be configured to determine a sampling function for generating a set of sequences from the matrix or Hadamard matrix. Determination component 198 may also be configured to generate a set of sequences by sampling one of a set of rows or a set of columns from the matrix based on the determined sampling function. Determination component 198 may also be configured to map a UCI payload to at least one sequence of the set of sequences. Determination component 198 may also be configured to modify the at least one sequence to generate at least one modified sequence. Determination component 198 may also be configured to point-wise multiplex at least one other sequence with each of the at least one sequence to generate at least one modified sequence. Determination component 198 may also be configured to convert the at least one sequence into at least one binary domain sequence. Determination component 198 may also be configured to modulate the at least one binary domain sequence based on $\pi/2$ binary phase shift keying (BPSK) modulation. Determination component 198 may also be configured to transmit a signal derived based on at least one sequence of the set of sequences.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
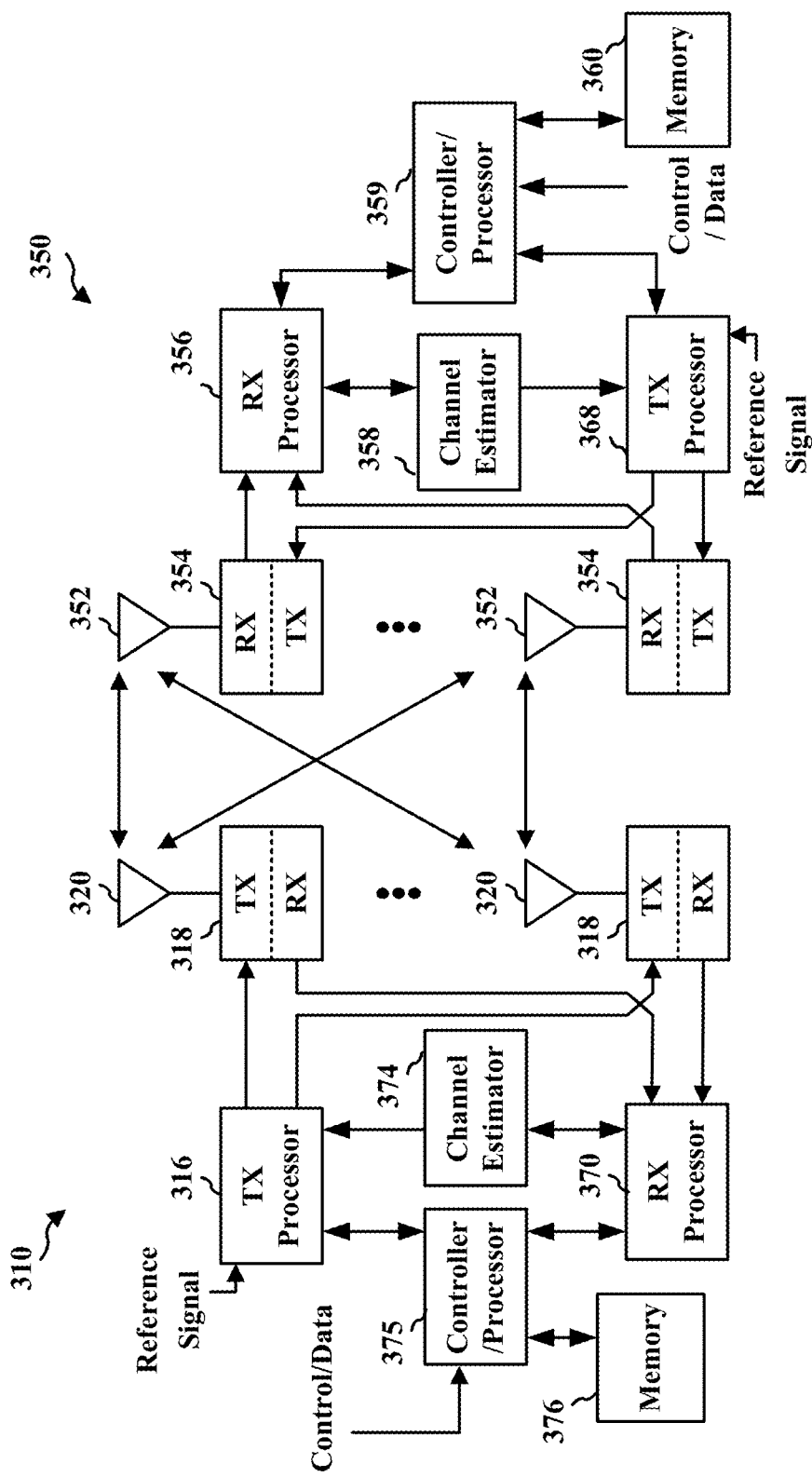
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with determination component 198 of FIG. 1.

At least one of the TX processor 316, the RX processor 370, and the controller/processor 375 may be configured to perform aspects in connection with determination component 198 of FIG. 1.

Sequences have many important applications in wireless communications. For instance, sequences can be designed for a number of different types of wireless communication. For example, sequences can be designed for a preamble for a random access procedure. Sequences can also be designed for a reference signal (RS), a secondary synchronization signal (SSS), a primary synchronization signal (PSS), a demodulation reference signal (DMRS), a channel state information reference signal (CSI-RS), a sounding RS (SRS), and/or a positioning RS (PRS).

Additionally, sequences can include a number of different performance metrics. For example, performance metrics for sequences can include capacity, cross-correlation, auto-correlation, or peak-to-average power ratio (PAPR). In some aspects, capacity can be the number of supported sequences in a sequence pool or a set of resources, i.e., the amount of sequences for a given set of resources.

In some instances, the present capacity of sequences utilized in wireless communications may not be sufficient to support all the communication needs for sequences. Accordingly, the amount of sequences for a given set of resources may need to be increased. As versions of wireless communications may include increased capacity for sequences, it may be beneficial to improve the capacity of sequences for different types of wireless communications.

Sequence design can be based on a variety of different sequences, e.g., Zadoff-Chu sequences and Gold sequences, both of which may have limited capacity. Some sequence designs can utilize sub-sampled DFT sequences, which can have a moderate capacity. However, the PAPR may not be optimized for these types of sequences. As such, it may be beneficial to improve the capacity of sequences, as well as optimize the PAPR for sequences.

A Hadamard matrix is a square matrix including entries that are either +1 or −1 and rows that are mutually orthogonal. A Hadamard matrix of order $2^m$, where m is an integer, is a matrix generated by taking the tensor power of a 2×2 matrix. For example, a Hadamard matrix of order $2^m$ can be $$H_{2^m} = \begin{bmatrix} 1 & 1 \\ 1 & -1 \end{bmatrix}^{\otimes m},$$

where $\otimes$ stands for tensor product. Accordingly, a Hadamard matrix of order 4 can be $$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}.$$

In addition, a Hadamard sequence can correspond to a particular row or column of a Hadamard matrix. It may be beneficial to accurately and efficiently sample a Hadamard matrix in order to generate a sequence. The length of a Hadamard sequence generated from the Hadamard matrix $H_{2^m}$ may be $2^m$. And the cardinality of the set of sequences (i.e., the capacity of the set of sequences) that can be generated from Hadamard matrix $H_{2^m}$ may also be $2^m$. In other words, cardinality of the set of Hadamard sequences may be equal to the length of each sequence in the set of Hadamard sequences. However, in many applications, it may be useful to generate a set of sequences whose length is much smaller than the cardinality (capacity). At the same time, the cross correlation between each pair of sequences in the set may be low. This is why it may be beneficial to subsample the set of Hadamard sequences to obtain a set of sequences with much smaller length and the same capacity. Additionally, it may be beneficial to generate sequences using deterministic sampling of Hadamard matrices.

Aspects of the present disclosure can more accurately and efficiently sample a Hadamard matrix in order to generate a sequence. Further, aspects of the present disclosure can utilize sequence design based on sub-sampled Hadamard matrices or sequences. In some aspects, sequences can be generated by sampling the rows or columns of Hadamard matrices. For instance, a Hadamard matrix can be randomly sampled in order to generate a sequence. By sampling a Hadamard matrix, a sequence with one or more desirable properties can be generated. In some aspects, it may be unclear how to most efficiently sample a Hadamard matrix to generate a sequence.

Aspects of the present disclosure can also generate sequences using deterministic sampling of Hadamard matrices, e.g., utilising the rows and columns of Hadamard matrices. Accordingly, aspects of the present disclosure can determine the manner in which a Hadamard matrix is sampled to generate a sequence. As indicated above, in one aspect, aspects of the present disclosure can select a sequence utilising the rows and columns of Hadamard matrices. In some instances, a wireless device may receive a sampling function and then generate a sequence based on the sampling function. As such, aspects of the present disclosure can utilize sequence design based on subsampled Hadamard sequences.

Aspects of the present disclosure can generate a number of sequences, e.g., M sequences, where M corresponds to a particular column in a Hadamard matrix. Also, aspects of the present disclosure can select a number of rows of a column to produce a determined sequence. In some aspects, for different sequences, aspects of the present disclosure can select the same rows of different columns to generate the sequences. For example, aspects of the present disclosure can sub-sample the same rows from each of the columns. In some instances, the deterministic sampling of the Hadamard matrix may determine which rows of the identified columns will be selected for the sequence generation.

In some instances, a sequence length can be represented by N and the sequence pool size, i.e., the number of sequences, can be represented by M. For example, $M=2^k$, $k \in \mathbb{N}$. If $M \neq 2^k$, aspects of the present disclosure may determine the smallest power of 2 that is larger than M and N.

In one aspect, aspects of the present disclosure can include a M×M Hadamard matrix corresponding to: $a=(a_{n,m})_{n,m=0}^{M-1}$. For example, n corresponds to the row index and m corresponds to the column index. Further, the M sequences $x_l=[x_l(0), x_l(1), \ldots, x_l(N-1)]$, $0 \leq l \leq M-1$ can be chosen as $x_l(n)=a_{f(n),l}$ for $0 \leq n \leq N-1$. For instance, $f(\cdot): \{0, \ldots, N-1\} \mapsto \{0, \ldots, M-1\}$ can denote the sampling function. Also, l may denote a particular column for generating the sequence, and n is the $n^{th}$ element of the sequence. Also, $a_{f(n),l}$ can indicate a row of $f(n)$ and a column of l. For each element of the sequence, aspects of the present disclosure can select a particular row, $f(n)$, of the selected column, l.

As indicated herein, to generate M sequences, aspects of the present disclosure can select a subset of row values in a selected column. Table 1 below illustrates a manner in which to select a subset of row values, $f(n)$, in a selected column, l. As further shown in Table 1 below, for each identified sequence, a particular column can be selected.

TABLE 1

$$\begin{bmatrix} a_{0,0}, & a_{0,1}, & a_{0,2}, & \ldots, & a_{0,M-1} \\ a_{10}, & a_{11}, & a_{12}, & \ldots, & a_{1,M-1} \\ a_{20}, & a_{21}, & a_{22}, & \ldots, & a_{2,M-1} \\ \vdots & \vdots & \vdots & & \vdots \\ a_{M-1,0}, & a_{M-1,1}, & a_{M-1,2}, & \ldots, & a_{M-1,M-1} \end{bmatrix} \leftarrow f(n)$$

Aspects of the present disclosure can include a number of example sampling functions. In some aspects, a sampling function, $f$, can ensure that $\{f(n)\}_{0 \leq n \leq N}$ may include a roughly equal number of even and odd rows. For instance, the sampling function can select roughly the same amount of odd rows and even rows in order to generate the sequence. In some aspects, a roughly equal amount may be no greater than a fixed number, e.g., three. As such, the difference or disparity between odd and even rows may be less than or equal to a fixed number, e.g., three.

Some aspects of the present disclosure can utilize a quadratic sampling function. For instance, $$f(n) = \left(a \cdot \frac{n(n+b)}{2} + c\right) \bmod M,$$

for $0 \leq n \leq N-1$. In this sampling function, a and b can be any positive odd number, e.g., 1, 3, 5, etc. Also, c can be any non-negative integer, e.g., 0, 1, 2, etc. Further, mod can be a modular operation. Also, the mod or modular operation may ensure that the selected row indices fall within a certain range, e.g., a range of $\{0, 1, \ldots, M-1\}$.

Aspects of the present disclosure can also utilize a cubic sampling function. For instance, $$f(n) = \left(a \frac{n(n+1)(2n+1)}{6} + b\right) \bmod M.$$

In this sampling function, a can be a positive odd number, e.g., 1, 3, 5, etc., and b can be a non-negative integer.

Some aspects of the present disclosure can utilize a Fibonacci-type or recursive sampling function. For instance, $f(n)=f(n-1)+f(n-2) \bmod M$, for $2 \leq m \leq N-1$, where $f(0)$ and $f(1)$ can be chosen to be a pair of integers that include one even and one odd number. For example, $f(0)=1$ and $f(1)=2$. Alternatively, aspects of the present disclosure can initialize the function with $f(0)$ and $f(1)$ when both are odd numbers. Also, the initialization of $f(0)$ and $f(1)$ may be determined: (1) with a configuration from the base station, or (2) based on a random seed. In both options (1) and (2) above, the determined values $f(0)$ and $f(1)$ may be subject to a restriction that both values are odd numbers, or one is an even number and one is an odd number. In some aspects, in order to determine the $n^{th}$ row of a matrix, aspects of the present disclosure can determine the sum of the $(n-1)^{th}$ row and the $(n-2)^{th}$ row including a mod M or a modular operation of M.

Aspects of the present disclosure can also specify properties of generated sequences. In some aspects, the sequences identified can have desirable cross correlation properties, which can be beneficial for detection. Also, aspects of the present disclosure can include sequences that are easy to generate and describe. For example, a table including a large amount of memory may not need to be stored in order to generate a sequence.

Also, aspects of the present disclosure can include easy to implement sequence detection or detection algorithms for sequences. For instance, aspects of the present disclosure can utilize a fast Hadamard transform, e.g., in order to speed up the computation of the sequences. In some aspects, this fast Hadamard transform can be utilized instead of matrix-vector multiplication.

Aspects of the present disclosure can also reduce the PAPR of sequences. In one instance, a sub-sampled Hadamard sequence can include values in the set $\{-1,+1\}$, i.e., this can be a BPSK modulated sequence. Aspects of the present disclosure may convert the sequence to π/2 BPSK modulated sequence by the following steps. First, aspects of the present disclosure can convert the sequence into the binary domain, e.g., −1 values are mapped to 0, and 1 values are mapped to 1. Also, −1 values can be mapped to 1, and 1 values can be mapped to 0. Then, aspects of the present disclosure can perform a π/2 BPSK modulation on the generated binary sequence.

Alternatively, aspects of the present disclosure can point-wise multiply a sequence with the original Hadamard sequence. For example, the point-wise multiplexed sequence can be one of:

$[1, j, 1, j, 1, j, 1, j, \ldots ]$, $[1, j, 1, j, 1, j, 1, j, \ldots ]^* \frac{1}{\sqrt{2}}(1+j)$, or $[1, j, -1, -j, 1, j, -1, -j, \ldots ]$, or $[1, j, -1, -j, 1, j, -1, -j, \ldots ]^* \frac{1}{\sqrt{2}}(1+j)$.

For instance, each sequence can have a 90 degree, i.e., π/2, phase shift between adjacent symbols.

In some aspects, the π/2 BPSK modulated sequence may have a lower PAPR than the original Hadamard sequence, e.g., when used together with transform precoding. For instance, a π/2 BPSK modulated sequence can ensure that there is not a large phase jump between adjacent symbols. This can result in a lower PAPR, which can be desirable in certain types of wireless communication applications.

In some instances, the aforementioned functions may be standardized, such that the UE can understand which functions to utilise. Also, a base station can configure the function to be utilized and communicate the function to the UE. In some aspects, the parameters in the sampling function may be configured, e.g., parameters a, b, c in a quadratic sampling function, parameters a, b in a cubic sampling function, or $f(0)$ and $f(1)$ in a recursive sampling function. Also, a family of functions may be standardized. Additionally, some aspects of the present disclosure can utilize sequences, e.g., noncoherent sequences, based on a PUCCH in order to convey small UCI payloads. The sequences designed by aspects of the present disclosure can be suitable for such use cases. Moreover, mechanisms proposed for mapping a UCI payload to a sequence can apply to Hadamard based sequences.

Figure 4:
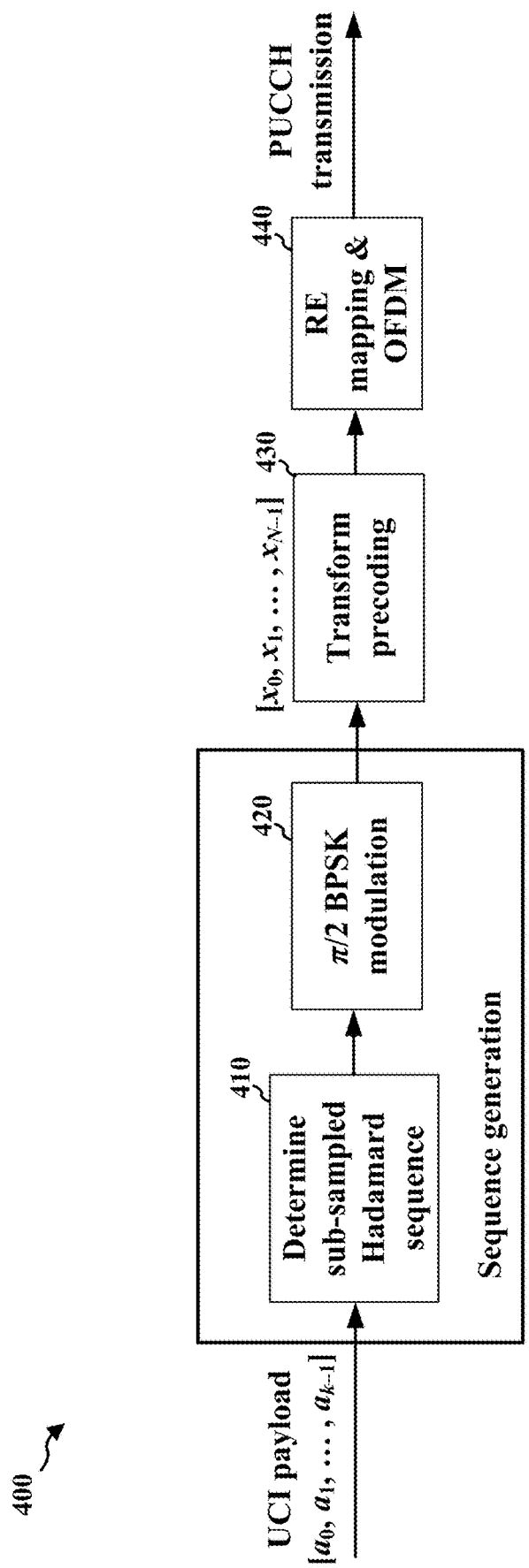
FIG. 4 is a diagram illustrating an example sequence generation process.

FIG. 4 is a diagram 400 illustrating an example sequence generation process. Diagram 400 includes sub-sampled Hadamard sequence determination process 410, π/2 BPSK modulation process 420, transform precoding process 430, and resource element (RE) mapping and OFDM process 440. As shown in FIG. 4, for a UCI payload of size k, e.g., k bits, aspects of the present disclosure can determine the corresponding sub-sampled Hadamard sequence for the k bits. Each candidate of k bits can correspond to a particular column of the Hadamard matrix. For example, if k is 5, there can be $2^5$ or 32 sequences, and aspects of the present disclosure can select one of the 32 sequences to represent the k bits.

After the sequences is selected, aspects of the present disclosure can utilize π/2 BPSK modulation process 420 in order to reduce the PAPR of the sequence. Next, the aspects of the present disclosure can utilize transform precoding process 430. Finally, aspects of the present disclosure can utilize the RE mapping and OFDM process 440.

Figure 5:
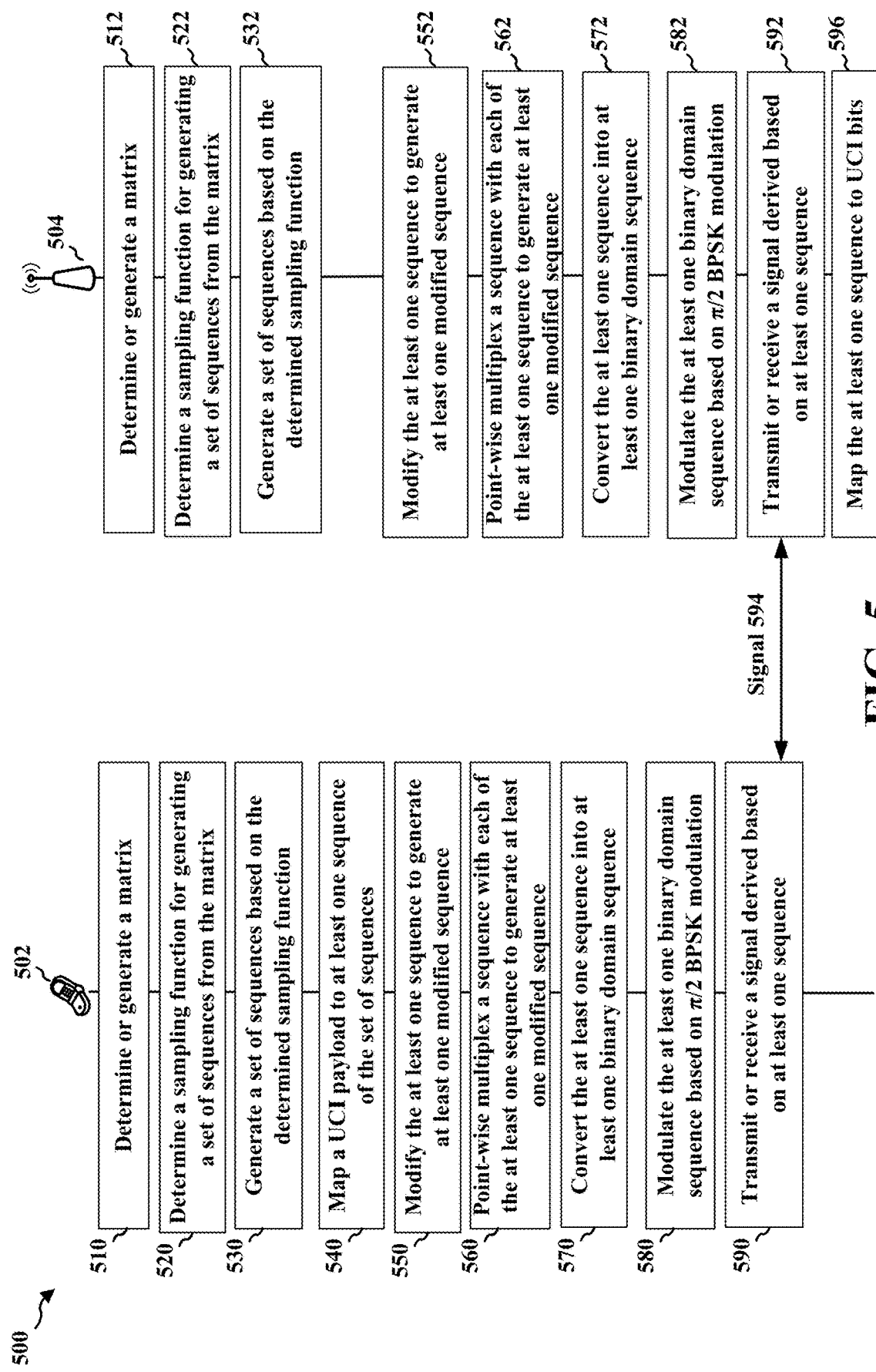
FIG. 5 is a diagram illustrating example communication between a UE and a base station.

FIG. 5 is a diagram 500 illustrating communications between a UE 502 and a base station 504. At 510, the UE 502 may determine or generate a matrix or Hadamard matrix associated with signal transmission, where the Hadamard matrix can include M rows and M columns. At 512, the base station 504 may also determine or generate a matrix or Hadamard matrix associated with signal transmission, where the Hadamard matrix can include M rows and M columns. As such, M may be an order of the Hadamard matrix.

At 520, the UE 502 may determine a sampling function for generating a set of sequences from the Hadamard matrix. At 522, the base station 504 may also determine a sampling function for generating a set of sequences from the Hadamard matrix.

At 530, the UE 502 may generate a set of sequences by sampling one of a set of rows or a set of columns from the matrix based on the determined sampling function. At 532, the base station 504 may also generate a set of sequences by sampling one of a set of rows or a set of columns based on the determined sampling function. In some aspects, the generated set of sequences can comprise M sequences. Also, the set of rows may comprise each row of the M rows and the set of columns may comprise each column of the M columns.

At 540, the UE 502 may map a UCI payload to at least one sequence of the set of sequences. In some aspects, the at least one sequence may be identified from the set of sequences.

At 550, the UE 502 may modify the at least one sequence to generate at least one modified sequence. At 552, the base station 504 may also modify the at least one sequence to generate at least one modified sequence.

At 560, the UE 502 may point-wise multiplex at least one other sequence with each of the at least one sequence to generate at least one modified sequence or point-wise multiplexed sequence. At 562, the base station 504 may also point-wise multiplex at least one other sequence with each of the at least one sequence to generate at least one modified sequence. In some aspects, the point-wise multiplexed sequence may include a π/2 phase shift between each pair of adjacent elements of the sequence.

At 570, the UE 502 may convert the at least one sequence into at least one binary domain sequence. At 572, the base station 504 may also convert the at least one sequence into at least one binary domain sequence.

At 580, the UE 502 may modulate the at least one binary domain sequence based on π/2 BPSK modulation. At 582, the base station 504 may also modulate the at least one binary domain sequence based on π/2 BPSK modulation.

At 590, the UE 502 may transmit or receive a signal 594 derived based on at least one sequence of the set of sequences. At 592, the base station 504 may also transmit or receive a signal 594 derived based on the determined at least one sequence. At 596, the base station 504 may map the at least one sequence to UCI bits.

In some aspects, the signal may be derived based on the at least one modified sequence. The signal may also be derived based on the modulated at least one binary domain sequence. Moreover, the signal may be derived based on the at least one modified sequence or point-wise multiplexed sequence.

In some instances, the signal may comprise one of a reference signal (RS), a secondary synchronization signal (SSS), a primary synchronization signal (PSS), a demodulation reference signal (DMRS), a channel state information (CSI) RS (CSI-RS), or a positioning RS (PRS). Additionally, the signal may comprise one of a preamble for a random access channel (RACH) procedure, a RS, a DMRS, a sounding RS (SRS), a positioning RS (PRS), or uplink control information (UCI).

In some aspects, the sampling function may be one of a quadratic sampling function, a cubic sampling function, or a recursive function. The sampling function may be a quadratic sampling function equal to $$f(n) = \left(a \cdot \frac{n(n+b)}{2} + c\right) \bmod M,$$

where M is an order of the Hadamard matrix, a and b are positive odd numbers, and c is a non-negative integer. The sampling function may also be a cubic sampling function equal to $$f(n) = \left(a \cdot \frac{n(n+1)(2n+1)}{6} + b\right) \bmod M,$$

where M is an order of the Hadamard matrix, a is a positive odd number, and b is a non-negative integer. Additionally, the sampling function may be a recursive function equal to $f(n)=f(n-1)+f(n-2) \mod M$, where M is an order of the Hadamard matrix.

In some instances, the set of sequences may be generated through sampling the set of columns of the M columns based on the determined sampling function. Also, each sequence of the set of sequences may be generated through sampling one column of the set of columns, and the sequence can include values from m odd numbered rows and n even numbered rows. For example, $|n-m| \leq 3$.

In some aspects, the set of sequences may be generated through sampling the set of rows of the M rows based on the determined sampling function. Also, each sequence of the set of sequences may be generated through sampling one row of the set of rows, and the sequence may include values from m odd numbered columns and n even numbered columns. For example, $|n-m| \leq 3$.

As shown in FIG. 5, there are a number of steps or processes on the UE side and the base station side. Each of the steps or processes shown in FIG. 5 may be optional. Further, some of the steps or processes may be alternative solutions to other steps or processes. For example, in some aspects, one of steps 550, 560, or 570+580 may be utilized at a given time.

Figure 6:
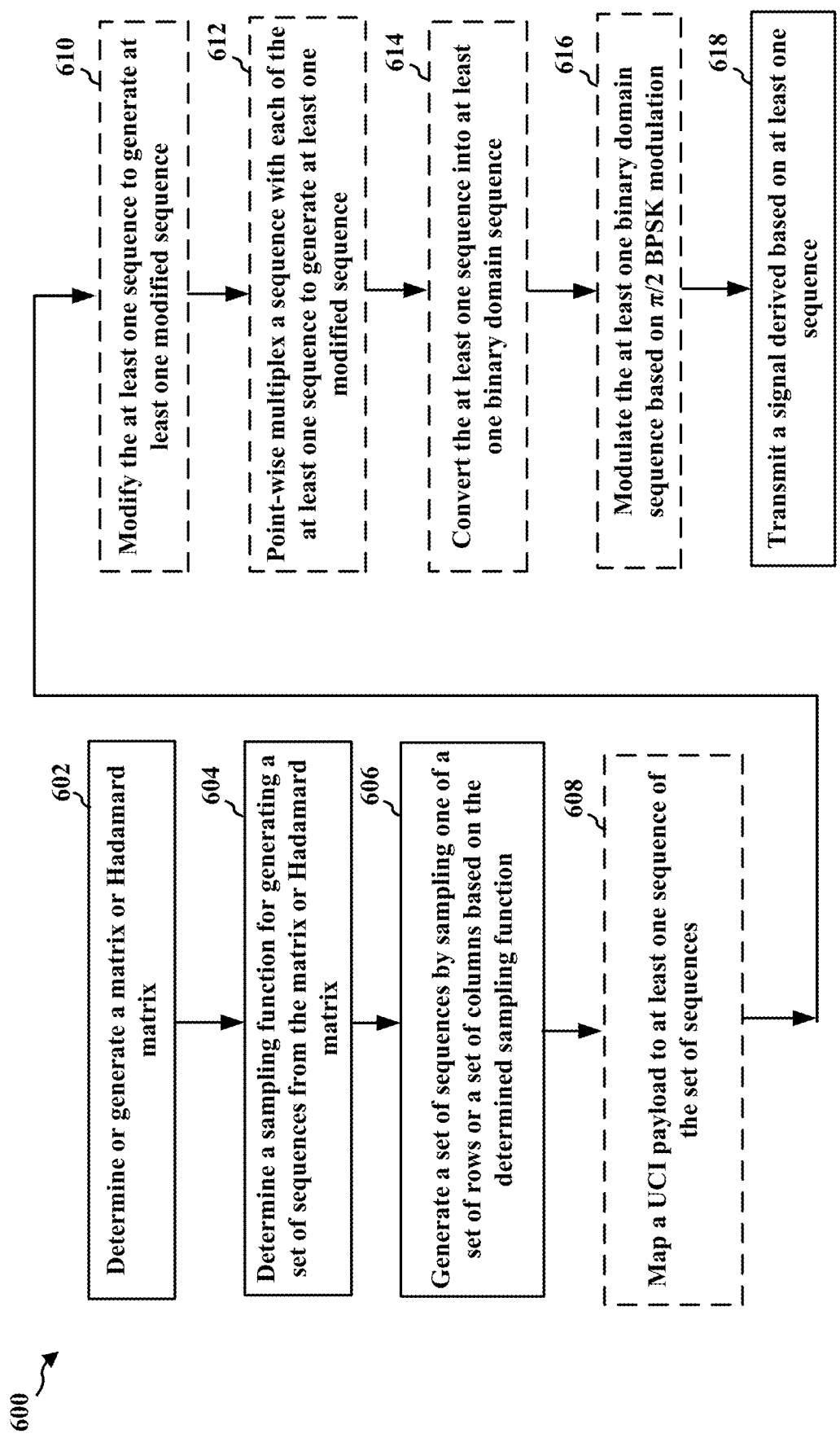
FIG. 6 is a flowchart of a method of wireless communication.

FIG. 6 is a flowchart 600 of a method of wireless communication. The method may be performed by a UE or a component of a UE (e.g., the UE 104, 350, 502; the apparatus 702; a processing system, which may include the memory 360 and which may be the entire UE or a component of the UE, such as the TX processor 368, the RX processor 356, and/or the controller/processor 359). The method may also be performed by a base station or a component of a base station (e.g., the base station 102, 310, 504; the apparatus 802; a processing system, which may include the memory 376 and which may be the entire base station or a component of the base station, such as the TX processor 316, the RX processor 370, and/or the controller/processor 375). Optional aspects are illustrated with a dashed line. The methods described herein can provide a number of benefits, such as improving communication signaling, resource utilisation, and/or power savings.

At 602, the UE or base station may determine and/or generate a matrix or Hadamard matrix associated with signal transmission, where the Hadamard matrix can include M rows and M columns, as described in connection with the examples in FIGS. 4 and 5. For example, as described in 510 of FIG. 5, UE 502 may determine and/or generate a matrix or Hadamard matrix associated with signal transmission, where the Hadamard matrix can include M rows and M columns. Also, as described in 512 of FIG. 5, base station 504 may determine and/or generate a matrix or Hadamard matrix associated with signal transmission, where the Hadamard matrix can include M rows and M columns. As shown in FIG. 4, the Hadamard matrix can correspond to the Hadamard sequence in 410. Further, 602 may be performed by determination component 740 in FIG. 7 and/or determination component 840 in FIG. 8. Also, M may be an order of the Hadamard matrix.

At 604, the UE or base station may determine a sampling function for generating a set of sequences from the matrix or Hadamard matrix, as described in connection with the examples in FIGS. 4 and 5. For example, as described in 520 of FIG. 5, UE 502 may determine a sampling function for generating a set of sequences from the matrix or Hadamard matrix. Also, as described in 522 of FIG. 5, base station 504 may determine a sampling function for generating a set of sequences from the matrix or Hadamard matrix. As shown in FIG. 4, the sampling function for generating a set of sequences can be associated with the Hadamard sequence in 410. Further, 604 may be performed by determination component 740 in FIG. 7 and/or determination component 840 in FIG. 8.

At 606, the UE or base station may generate a set of sequences by sampling one of a set of rows or a set of columns from the matrix based on the determined sampling function, as described in connection with the examples in FIGS. 4 and 5. For example, as described in 530 of FIG. 5, UE 502 may generate a set of sequences by sampling one of a set of rows or a set of columns from the matrix based on the determined sampling function. Also, as described in 532 of FIG. 5, base station 504 may generate a set of sequences by sampling one of a set of rows or a set of columns from the matrix based on the determined sampling function. As shown in FIG. 4, the set of sequences can be associated with the Hadamard sequence in 410. Further, 606 may be performed by determination component 740 in FIG. 7 and/or determination component 840 in FIG. 8. In some aspects, the generated set of sequences can comprise M sequences. Also, the set of rows may comprise each row of the M rows and the set of columns may comprise each column of the M columns.

At 608, the UE or base station may map a UCI payload to at least one sequence of the set of sequences, as described in connection with the examples in FIGS. 4 and 5. For example, as described in 540 of FIG. 5, UE 502 may map a UCI payload to at least one sequence of the set of sequences. Further, 608 may be performed by determination component 740 in FIG. 7 and/or determination component 840 in FIG. 8. In some aspects, the at least one sequence may be identified from the set of sequences.

At 610, the UE or base station may modify the at least one sequence to generate at least one modified sequence, as described in connection with the examples in FIGS. 4 and 5. For example, as described in 550 of FIG. 5, UE 502 may modify the at least one sequence to generate at least one modified sequence. Also, as described in 552 of FIG. 5, base station 504 may modify the at least one sequence to generate at least one modified sequence. Further, 610 may be performed by determination component 740 in FIG. 7 and/or determination component 840 in FIG. 8.

At 612, the UE or base station may point-wise multiplex at least one other sequence with each of the at least one sequence to generate at least one modified sequence or point-wise multiplexed sequence, as described in connection with the examples in FIGS. 4 and 5. For example, as described in 560 of FIG. 5, UE 502 may point-wise multiplex at least one other sequence with each of the at least one sequence to generate at least one modified sequence or point-wise multiplexed sequence. Also, as described in 562 of FIG. 5, base station 504 may point-wise multiplex at least one other sequence with each of the at least one sequence to generate at least one modified sequence or point-wise multiplexed sequence. Further, 612 may be performed by determination component 740 in FIG. 7 and/or determination component 840 in FIG. 8. In some aspects, the point-wise multiplexed sequence may include a $\pi/2$ phase shift between each pair of adjacent elements of the sequence.

At 614, the UE or base station may convert the at least one sequence into at least one binary domain sequence, as described in connection with the examples in FIGS. 4 and 5. For example, as described in 570 of FIG. 5, UE 502 may convert the at least one sequence into at least one binary domain sequence. Also, as described in 572 of FIG. 5, base station 504 may convert the at least one sequence into at least one binary domain sequence. Further, 614 may be performed by determination component 740 in FIG. 7 and/or determination component 840 in FIG. 8.

At 616, the UE or base station may modulate the at least one binary domain sequence based on π/2 BPSK modulation, as described in connection with the examples in FIGS. 4 and 5. For example, as described in 580 of FIG. 5, UE 502 may modulate the at least one binary domain sequence based on π/2 BPSK modulation. Also, as described in 582 of FIG. 5, base station 504 may modulate the at least one binary domain sequence based on π/2 BPSK modulation. Further, 616 may be performed by determination component 740 in FIG. 7 and/or determination component 840 in FIG. 8.

At 618, the UE or base station may transmit or receive a signal derived based on at least one sequence of the set of sequences, as described in connection with the examples in FIGS. 4 and 5. For example, as described in 590 of FIG. 5, UE 502 may transmit or receive a signal derived based on at least one sequence of the set of sequences. Also, as described in 592 of FIG. 5, base station 504 may transmit or receive a signal derived based on at least one sequence of the set of sequences. Further, 618 may be performed by determination component 740 in FIG. 7 and/or determination component 840 in FIG. 8. In some aspects, the signal may be derived based on the at least one modified sequence. The signal may also be derived based on the modulated at least one binary domain sequence. Moreover, the signal may be derived based on the at least one modified sequence or point-wise multiplexed sequence.

In some instances, the signal may comprise one of a reference signal (RS), a secondary synchronization signal (SSS), a primary synchronization signal (PSS), a demodulation reference signal (DMRS), a channel state information (CSI) RS (CSI-RS), or a positioning RS (PRS). Additionally, the signal may comprise one of a preamble for a random access channel (RACH) procedure, a RS, a DMRS, a sounding RS (SRS), a positioning RS (PRS), or uplink control information (UCI).

In some aspects, the sampling function may be one of a quadratic sampling function, a cubic sampling function, or a recursive function. The sampling function may be a quadratic sampling function equal to $$f(n) = \left(a \cdot \frac{n(n+b)}{2} + c\right) \bmod M,$$

where M is an order of the Hadamard matrix, a and b are positive odd numbers, and c is a non-negative integer. The sampling function may also be a cubic sampling function equal to $$f(n) = \left(a \cdot \frac{n(n+1)(2n+1)}{6} + b\right) \bmod M,$$

where M is an order of the Hadamard matrix, a is a positive odd number, and b is a non-negative integer. Additionally, the sampling function may be a recursive function equal to ƒ(n)=ƒ(n−1)+ƒ(n−2)mod M, where M is an order of the Hadamard matrix.

In some instances, the set of sequences may be generated through sampling the set of columns of the matrix based on the determined sampling function. Also, each sequence of the set of sequences may be generated through sampling one column of the set of columns, and the sequence can include values from m odd numbered rows and n even numbered rows. For example, |n−m|≤3.

In some aspects, the set of sequences may be generated through sampling the set of rows of the M rows based on the determined sampling function. Also, each sequence of the set of sequences may be generated through sampling one row of the set of rows, and the sequence may include values from m odd numbered columns and n even numbered columns. For example, |n−m|≤3.

Figure 7:
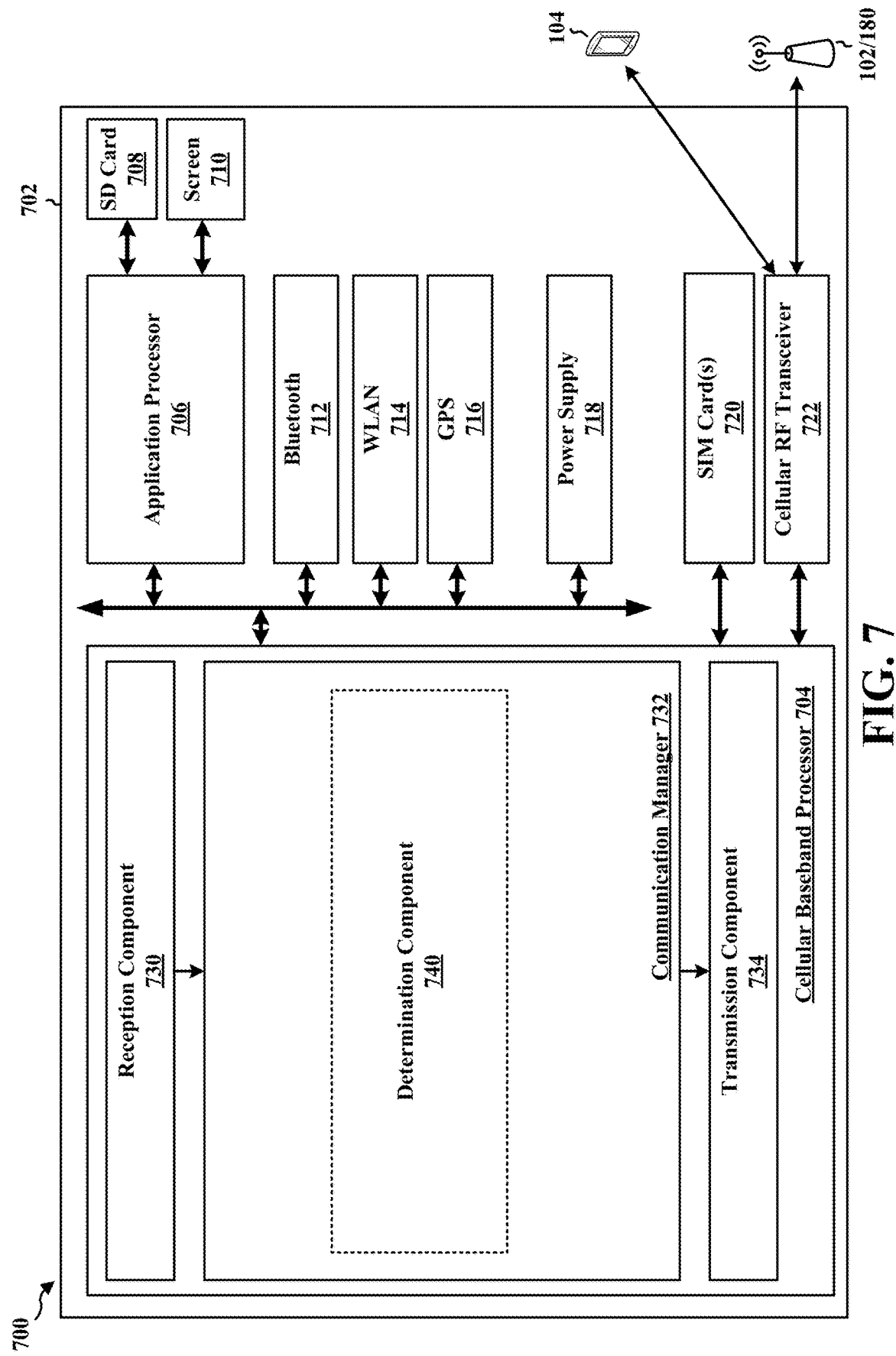
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforediscussed additional modules of the apparatus 702.

The communication manager 732 includes a determination component 740 that is configured to determine a matrix associated with signal transmission, the matrix including M rows and M columns, e.g., as described in connection with 602 in FIG. 6. Determination component 740 is also configured to determine a sampling function for generating a set of sequences from the matrix, e.g., as described in connection with 604 in FIG. 6. Determination component 740 is also configured to generate a set of sequences through sampling one of a set of rows or a set of columns based on the determined sampling function, e.g., as described in connection with 606 in FIG. 6. Determination component 740 is also configured to transmit a signal derived based on the determined at least one sequence, e.g., as described in connection with 620 in FIG. 6.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for determining a matrix associated with signal transmission, the matrix including M rows and M columns; means for determining a sampling function for generating a set of sequences from the matrix; means for generating a set of sequences by sampling one of a set of rows or a set of columns from the matrix based on the determined sampling function; means for transmitting a signal derived based on at least one sequence; means for generating the Hadamard matrix; means for mapping a UCI payload to at least one sequence of the set of sequences; means for modifying the at least one sequence to generate at least one modified sequence, where the signal is derived based on the at least one modified sequence; means for converting the at least one sequence into at least one binary domain sequence; means for modulating the at least one binary domain sequence based on π/2 binary phase shift keying (BPSK) modulation, where the signal is derived based on the modulated at least one binary domain sequence; means for point-wise multiplexing a sequence with each of the at least one sequence to generate at least one modified sequence, where the signal is derived based on the at least one modified sequence. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
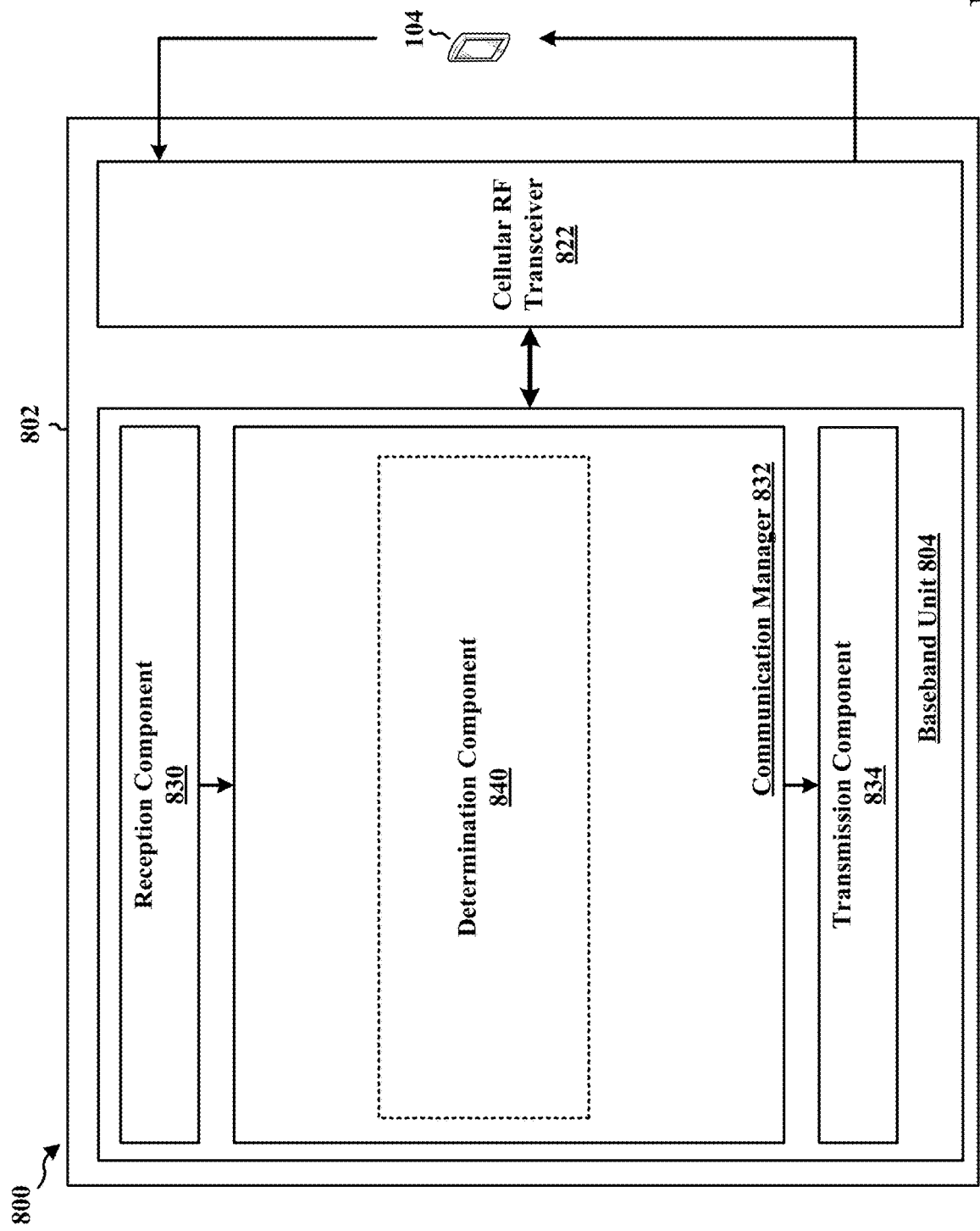
FIG. 8 is a diagram illustrating an example of a hardware implementation for an example apparatus.

FIG. 8 is a diagram 800 illustrating an example of a hardware implementation for an apparatus 802. The apparatus 802 is a base station (BS) and includes a baseband unit 804. The baseband unit 804 may communicate through a cellular RF transceiver 822 with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes a determination component 840 that is configured to determine a matrix associated with signal transmission, the matrix including M rows and M columns, e.g., as described in connection with 602 in FIG. 6. Determination component 840 is also configured to determine a sampling function for generating a set of sequences from the matrix, e.g., as described in connection with 604 in FIG. 6. Determination component 840 is also configured to generate a set of sequences through sampling one of a set of rows or a set of columns based on the determined sampling function, e.g., as described in connection with 606 in FIG. 6. Determination component 840 is also configured to transmit a signal derived based on the determined at least one sequence, e.g., as described in connection with 620 in FIG. 6.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for determining a matrix associated with signal transmission, the matrix including M rows and M columns; means for determining a sampling function for generating a set of sequences from the matrix; means for generating a set of sequences through sampling one of a set of rows or a set of columns based on the determined sampling function; means for transmitting a signal derived based on the determined at least one sequence; means for generating the Hadamard matrix; means for mapping a UCI payload to at least one sequence of the set of sequences; means for modifying the at least one sequence to generate at least one modified sequence, where the signal is derived based on the at least one modified sequence; means for converting the at least one sequence into at least one binary domain sequence; means for modulating the at least one binary domain sequence based on π/2 binary phase shift keying (BPSK) modulation, where the signal is derived based on the modulated at least one binary domain sequence; means for point-wise multiplexing a sequence with each of the at least one sequence to generate at least one modified sequence, where the signal is derived based on the at least one modified sequence. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Aspect 1 is a method of wireless communication. The method includes determining a matrix associated with signal transmission, the matrix including M rows and M columns; determining a sampling function for generating a set of sequences from the matrix; generating a set of sequences through sampling one of a set of rows or a set of columns based on the determined sampling function; and transmitting a signal derived based on the determined at least one sequence.

Aspect 2 is the method of aspect 1, where the matrix is a Hadamard matrix, where M is an order of the Hadamard matrix.

Aspect 3 is the method of any of aspects 1 and 2, further comprising generating the Hadamard matrix.

Aspect 4 is the method of any of aspects 1 to 3, where the sampling function is one of a quadratic sampling function, a cubic sampling function, or a recursive function.

Aspect 5 is the method of any of aspects 1 to 4, where the sampling function is a quadratic sampling function equal to $$f(n) = \left(a \cdot \frac{n(n+b)}{2} + c\right) \bmod M,$$

where a and b are positive odd numbers and c is a non-negative integer.

Aspect 6 is the method of any of aspects 1 to 5, where the sampling function is a cubic sampling function equal to $$f(n) = \left(a \cdot \frac{n(n+1)(2n+1)}{6} + b\right) \bmod M,$$

where a is a positive odd number and b is a non-negative integer.

Aspect 7 is the method of any of aspects 1 to 6, where the sampling function is a recursive function equal to $f(n)=f(n-1)+f(n-2) \bmod M$.

Aspect 8 is the method of any of aspects 1 to 7, where the generated set of sequences comprises M sequences.

Aspect 9 is the method of any of aspects 1 to 8, where the set of rows comprises each row of the M rows and the set of columns comprises each column of the M columns.

Aspect 10 is the method of any of aspects 1 to 9, where the method is performed by a base station, the signal comprising one of a reference signal (RS), a secondary synchronization signal (SSS), a primary synchronization signal (PSS), a demodulation reference signal (DMRS), a channel state information (CSI) RS (CSI-RS), or a positioning RS (PRS).

Aspect 11 is the method of any of aspects 1 to 10, where the method is performed by a user equipment (UE), the signal comprising one of a preamble for a random access channel (RACH) procedure, a reference signal (RS), a demodulation reference signal (DMRS), a sounding RS (SRS), a positioning RS (PRS), or uplink control information (UCI).

Aspect 12 is the method of any of aspects 1 to 11, where the signal comprises UCI, and the determining the at least one sequence comprises mapping a UCI payload to at least one sequence of the set of sequences.

Aspect 13 is the method of any of aspects 1 to 12, further comprising modifying the at least one sequence to generate at least one modified sequence, where the signal is derived based on the at least one modified sequence.

Aspect 14 is the method of any of aspects 1 to 13, further comprising converting the at least one sequence into at least one binary domain sequence; and modulating the at least one binary domain sequence based on $\pi/2$ binary phase shift keying (BPSK) modulation, where the signal is derived based on the modulated at least one binary domain sequence.

Aspect 15 is the method of any of aspects 1 to 14, further comprising point-wise multiplexing at least one other sequence with each of the at least one sequence to generate at least one modified sequence, where the signal is derived based on the at least one modified sequence.

Aspect 16 is the method of any of aspects 1 to 15, where the point-wise multiplexed sequence includes a $\pi/2$ phase shift between each pair of adjacent elements of the sequence.

Aspect 17 is the method of any of aspects 1 to 16, where the set of sequences are generated through sampling the set of columns of the matrix based on the determined sampling function.

Aspect 18 is the method of any of aspects 1 to 17, where each sequence of the set of sequences is generated through sampling one column of the set of columns, and the sequence includes values from m odd numbered rows and n even numbered rows.

Aspect 19 is the method of any of aspects 1 to 18, where $|n-m| \leq 3$.

Aspect 20 is the method of any of aspects 1 to 19, where the set of sequences are generated through sampling the set of rows of the matrix based on the determined sampling function.

Aspect 21 is the method of any of aspects 1 to 20, where each sequence of the set of sequences is generated through sampling one row of the set of rows, and the sequence includes values from m odd numbered columns and n even numbered columns.

Aspect 22 is the method of any of aspects 1 to 21, where $|n-m|\leq 3$.

Aspect 23 is an apparatus for wireless communication including means for implementing a method as in any of aspects 1 to 22.

Aspect 24 is an apparatus for wireless communication including at least one processor coupled to a memory and configured to implement a method as in any of aspects 1 to 22.

Aspect 25 is a computer-readable medium storing computer executable code, where the code when executed by a processor causes the processor to implement a method as in any of aspects 1 to 22.

What is claimed is:

1. A method of wireless communication, comprising:
   determining a sampling function for generating a set of sequences from a matrix, wherein the matrix includes M rows and M columns;
   generating, based on the sampling function, the set of sequences by sampling one of a set of rows or a set of columns from the matrix; and
   transmitting a signal, wherein the signal is based on at least one sequence of the set of sequences, wherein:
   (a) the sampling function is a quadratic function including $(a \cdot x(x+b)/2+c) \bmod M$, wherein a and b are positive odd numbers and c is a non-negative integer, and wherein x is a positive integer;
   (b) the sampling function is a cubic function including $(d \cdot y(y+1)(2y+1)/6+e) \bmod M$, wherein d is a positive odd number and e is a non-negative integer, and wherein y is a positive integer;
   (c) the sampling function is a recursive function equal to $f(z)=f(z-1)+f(z-2) \bmod M$;
   (d) each sequence of the set of sequences is based on sampling one column of the set of columns, and the set of sequences includes values from m odd numbered rows and n even numbered rows; or
   (e) the method further comprises: converting the at least one sequence into at least one binary domain sequence and modulating the at least one binary domain sequence based on π/2 binary phase shift keying (BPSK) modulation, wherein the signal is based on the modulated at least one binary domain sequence.

2. The method of claim 1, wherein the matrix is a Hadamard matrix, wherein M is an order of the Hadamard matrix.

3. The method of claim 2, further comprising:
   generating the Hadamard matrix.

4. The method of claim 1, wherein the set of rows comprises each row of the M rows and the set of columns comprises each column of the M columns.

5. The method of claim 1, wherein the method is performed by a base station, and wherein the signal comprises one of a reference signal (RS), a secondary synchronization signal (SSS), a primary synchronization signal (PSS), a demodulation reference signal (DMRS), a channel state information (CSI) RS (CSI-RS), or a positioning RS (PRS).

6. The method of claim 1, wherein the method is performed by a user equipment (UE), and wherein the signal comprises one of a preamble for a random access channel (RACH) procedure, a reference signal (RS), a demodulation reference signal (DMRS), a sounding RS (SRS), a positioning RS (PRS), or uplink control information (UCI).

7. The method of claim 6, further comprising:
   mapping a UCI payload to the at least one sequence of the set of sequences.

8. The method of claim 1, wherein $|n-m|\leq 3$.

9. An apparatus for wireless communication, comprising:
   a memory; and
   at least one processor coupled to the memory, wherein the apparatus is configured to:
   determine a sampling function for generating a set of sequences from a matrix, wherein the matrix includes M rows and M columns;
   generate, based on the sampling function, the set of sequences by sampling one of a set of rows or a set of columns from the matrix;
   convert at least one sequence of the set of sequences into at least one binary domain sequence;
   modulate the at least one binary domain sequence based on π/2 binary phase shift keying (BPSK) modulation; and
   transmit a signal, wherein the signal is based on the modulated at least one binary domain sequence.

10. The apparatus of claim 9, wherein the matrix is a Hadamard matrix, wherein M is an order of the Hadamard matrix.

11. The apparatus of claim 10, wherein the at least one processor apparatus is configured to:
    generate the Hadamard matrix.

12. The apparatus of claim 9, wherein the sampling function is a quadratic function including $$\left(a \cdot \frac{n(n+b)}{2} + c\right) \bmod M,$$

wherein a and b are positive odd numbers and c is a non-negative integer, and wherein n is a positive integer.

13. The apparatus of claim 9, wherein the sampling function is a cubic function including $$\left(a \cdot \frac{n(n+1)(2n+1)}{6} + b\right) \bmod M,$$

wherein a is a positive odd number and b is a non-negative integer, and wherein n is a positive integer.

14. The apparatus of claim 9, wherein the sampling function is a recursive function equal to $f(n)=f(n-1)+f(n-2) \bmod M$.

15. The apparatus of claim 9, wherein the generated set of sequences comprises M sequences.

16. The apparatus of claim 9, wherein the set of rows comprises each row of the M rows and the set of columns comprises each column of the M columns.

17. The apparatus of claim 9, wherein the apparatus is a base station, and wherein the signal comprises one of a reference signal (RS), a secondary synchronization signal (SSS), a primary synchronization signal (PSS), a demodulation reference signal (DMRS), a channel state information (CSI) RS (CSI-RS), or a positioning RS (PRS).

18. The apparatus of claim 9, wherein the apparatus is a user equipment (UE), and wherein the signal comprises one of a preamble for a random access channel (RACH) procedure, a reference signal (RS), a demodulation reference signal (DMRS), a sounding RS (SRS), a positioning RS (PRS), or uplink control information (UCI).

19. An apparatus for wireless communication, comprising:
a memory; and
at least one processor coupled to the memory, wherein the apparatus is configured to:
determine a sampling function for generating a set of sequences from a matrix, wherein the matrix includes M rows and M columns;
generate, based on the sampling function, the set of sequences by sampling a set of columns from the matrix, wherein the set of sequences includes values from x odd numbered rows and y even numbered rows; and
transmit a signal, wherein the signal is based on at least one sequence of the set of sequences.

20. The apparatus of claim 19, wherein the matrix is a Hadamard matrix, wherein M is an order of the Hadamard matrix.

21. The apparatus of claim 20, wherein the apparatus is configured to:
generate the Hadamard matrix.

22. The apparatus of claim 19, wherein the sampling function is a quadratic function including $$\left(a \cdot \frac{n(n+b)}{2} + c\right) \bmod M,$$

wherein a and b are positive odd numbers and c is a non-negative integer, and wherein n is a positive integer.

23. The apparatus of claim 19, wherein the sampling function is a cubic function including $$\left(a \cdot \frac{n(n+1)(2n+1)}{6} + b\right) \bmod M,$$

wherein a is a positive odd number and b is a non-negative integer, and wherein n is a positive integer.

24. The apparatus of claim 19, wherein the sampling function is a recursive function equal to $f(n)=f(n-1)+f(n-2) \bmod M$.

25. The apparatus of claim 19, wherein the set of sequences comprises M sequences.

26. The apparatus of claim 19, wherein the set of rows comprises each row of the M rows and the set of columns comprises each column of the M columns.

27. The apparatus of claim 19, wherein the apparatus is a base station, and wherein the signal comprises one of a reference signal (RS), a secondary synchronization signal (SSS), a primary synchronization signal (PSS), a demodulation reference signal (DMRS), a channel state information (CSI) RS (CSI-RS), or a positioning RS (PRS).

28. The apparatus of claim 19, wherein the apparatus is a user equipment (UE), and wherein the signal comprises one of a preamble for a random access channel (RACH) procedure, a reference signal (RS), a demodulation reference signal (DMRS), a sounding RS (SRS), a positioning RS (PRS), or uplink control information (UCI).

29. The apparatus of claim 19, wherein the apparatus is configured to:
convert the at least one sequence into at least one binary domain sequence; and
modulate the at least one binary domain sequence based on π/2 binary phase shift keying (BPSK) modulation, wherein the signal is based on the modulated at least one binary domain sequence.

30. The apparatus of claim 19, wherein |y−x|≤3.

31. An apparatus for wireless communication, comprising:
a memory; and
at least one processor coupled to the memory, wherein apparatus is configured to:
generate, based on a quadratic function, a set of sequences by sampling one of a set of rows or a set of columns from a matrix including M rows and M columns, wherein the quadratic function includes $$\left(a \cdot \frac{n(n+b)}{2} + c\right) \bmod M,$$

wherein a and b are positive odd numbers and c is a non-negative integer, and wherein n is a positive integer; and
transmit a signal, wherein the signal is based on at least one sequence of the set of sequences.

32. The apparatus of claim 31, wherein the matrix is a Hadamard matrix, wherein M is an order of the Hadamard matrix.

33. The apparatus of claim 32, wherein the apparatus is configured to:
generate the Hadamard matrix.

34. The apparatus of claim 31, wherein the set of sequences comprises M sequences.

35. The apparatus of claim 31, wherein the set of rows comprises each row of the M rows and the set of columns comprises each column of the M columns.

36. The apparatus of claim 31, wherein the apparatus is a base station, and wherein the signal comprises one of a reference signal (RS), a secondary synchronization signal (SSS), a primary synchronization signal (PSS), a demodulation reference signal (DMRS), a channel state information (CSI) RS (CSI-RS), or a positioning RS (PRS).

37. The apparatus of claim 31, wherein the apparatus is a user equipment (UE), and wherein the signal comprises one of a preamble for a random access channel (RACH) procedure, a reference signal (RS), a demodulation reference signal (DMRS), a sounding RS (SRS), a positioning RS (PRS), or uplink control information (UCI).

38. The apparatus of claim 37, wherein the apparatus is configured to:
map a UCI payload to the at least one sequence of the set of sequences.

39. The apparatus of claim 31, wherein the apparatus is configured to:
modify the at least one sequence to generate at least one modified sequence, wherein the signal is based on the at least one modified sequence.

40. The apparatus of claim 31, wherein the apparatus is configured to:
convert the at least one sequence into the at least one binary domain sequence; and modulate the at least one binary domain sequence based on the π/2 BPSK modulation, wherein the signal is based on the modulated at least one binary domain sequence.

41. The apparatus of claim 31, wherein the apparatus is configured to:
point-wise multiplex at least one other sequence with each of the at least one sequence to generate at least one modified sequence, wherein the signal is based on the at least one modified sequence.

42. The apparatus of claim 41, wherein the point-wise multiplexed sequence includes a π/2 phase shift.

43. The apparatus of claim 31, wherein to generate the set of sequences by sampling one of the set of rows or the set of columns from the matrix, the apparatus is configured to generate the set of sequences by sampling the set of columns from the matrix.

44. An apparatus for wireless communication, comprising:
a memory; and
at least one processor coupled to the memory, wherein apparatus is configured to:
generate, based on a cubic function, a set of sequences by sampling one of a set of rows or a set of columns from a matrix including M rows and M columns, wherein the cubic function includes $$\left(a \cdot \frac{n(n+1)(2n+1)}{6} + b\right) \mod M,$$

wherein a is a positive odd number and b is a non-negative integer, and wherein n is a positive integer; and
transmit a signal, wherein the signal is based on at least one sequence of the set of sequences.

45. The apparatus of claim 44, wherein the matrix is a Hadamard matrix, wherein M is an order of the Hadamard matrix.

46. The apparatus of claim 45, wherein the apparatus is configured to:
generate the Hadamard matrix.

47. The apparatus of claim 44, wherein the set of sequences comprises M sequences.

48. The apparatus of claim 44, wherein the set of rows comprises each row of the M rows and the set of columns comprises each column of the M columns.

49. The apparatus of claim 44, wherein the apparatus is a base station, and wherein the signal comprises one of a reference signal (RS), a secondary synchronization signal (SSS), a primary synchronization signal (PSS), a demodulation reference signal (DMRS), a channel state information (CSI) RS (CSI-RS), or a positioning RS (PRS).

50. The apparatus of claim 44, wherein the apparatus is a user equipment (UE), and wherein the signal comprises one of a preamble for a random access channel (RACH) procedure, a reference signal (RS), a demodulation reference signal (DMRS), a sounding RS (SRS), a positioning RS (PRS), or uplink control information (UCI).

51. The apparatus of claim 50, wherein the apparatus is configured to:
map a UCI payload to the at least one sequence of the set of sequences.

52. The apparatus of claim 44, wherein the apparatus is configured to:
modify the at least one sequence to generate at least one modified sequence, wherein the signal is based on the at least one modified sequence.

53. The apparatus of claim 44, wherein the apparatus is configured to:
convert the at least one sequence into the at least one binary domain sequence; and
modulate the at least one binary domain sequence based on the π/2 BPSK modulation, wherein the signal is based on the modulated at least one binary domain sequence.

54. The apparatus of claim 44, wherein the apparatus is configured to:
point-wise multiplex at least one other sequence with each of the at least one sequence to generate at least one modified sequence, wherein the signal is based on the at least one modified sequence.

55. The apparatus of claim 54, wherein the point-wise multiplexed sequence includes a π/2 phase shift.

56. The apparatus of claim 44, wherein to generate the set of sequences by sampling one of the set of rows or the set of columns from the matrix, the apparatus is configured to generate the set of sequences by sampling the set of columns from the matrix.

57. An apparatus for wireless communication, comprising:
a memory; and
at least one processor coupled to the memory, wherein apparatus is configured to:
generate, based on a recursive function, a set of sequences by sampling one of a set of rows or a set of columns from a matrix including M rows and M columns, wherein the recursive function is equal to $f(n)=f(n-1)+f(n-2) \mod M$; and
transmit a signal, wherein the signal is based on at least one sequence of the set of sequences.

58. The apparatus of claim 57, wherein the matrix is a Hadamard matrix, wherein M is an order of the Hadamard matrix.

59. The apparatus of claim 58, wherein the apparatus is configured to:
generate the Hadamard matrix.

60. The apparatus of claim 57, wherein the set of sequences comprises M sequences.

61. The apparatus of claim 57, wherein the set of rows comprises each row of the M rows and the set of columns comprises each column of the M columns.

62. The apparatus of claim 57, wherein the apparatus is a base station, and wherein the signal comprises one of a reference signal (RS), a secondary synchronization signal (SSS), a primary synchronization signal (PSS), a demodulation reference signal (DMRS), a channel state information (CSI) RS (CSI-RS), or a positioning RS (PRS).

63. The apparatus of claim 57, wherein the apparatus is a user equipment (UE), and wherein the signal comprises one of a preamble for a random access channel (RACH) procedure, a reference signal (RS), a demodulation reference signal (DMRS), a sounding RS (SRS), a positioning RS (PRS), or uplink control information (UCI).

64. The apparatus of claim 63, wherein the apparatus is configured to:
map a UCI payload to the at least one sequence of the set of sequences.

65. The apparatus of claim 57, wherein the apparatus is configured to:

modify the at least one sequence to generate at least one modified sequence, wherein the signal is based on the at least one modified sequence.

66. The apparatus of claim 57, wherein the apparatus is configured to:
convert the at least one sequence into the at least one binary domain sequence; and
modulate the at least one binary domain sequence based on the π/2 BPSK modulation, wherein the signal is based on the modulated at least one binary domain sequence.

67. The apparatus of claim 57, wherein the apparatus is configured to:
point-wise multiplex at least one other sequence with each of the at least one sequence to generate at least one modified sequence, wherein the signal is based on the at least one modified sequence.

68. The apparatus of claim 67, wherein the point-wise multiplexed sequence includes a π/2 phase shift.

69. The apparatus of claim 57, wherein to generate the set of sequences by sampling one of the set of rows or the set of columns from the matrix, the apparatus is configured to generate the set of sequences by sampling the set of columns from the matrix.

* * * * *